(12) United States Patent
Middelmann et al.

(10) Patent No.: US 6,193,037 B1
(45) Date of Patent: Feb. 27, 2001

(54) HYDRODYNAMIC TORQUE CONVERTER

(75) Inventors: Volker Middelmann, Wooster; Wendy Boman, Medina; Mircea Gradu, Wooster, all of OH (US)

(73) Assignee: Luk Getreibe-Systeme GmbH, Buhl Baden (DE)

( * ) Notice: Subject to any disclaimer, the term of this patent is extended or adjusted under 35 U.S.C. 154(b) by 0 days.

(21) Appl. No.: 09/284,426

(22) PCT Filed: Aug. 6, 1998

(86) PCT No.: PCT/DE98/02325

§ 371 Date: Aug. 20, 1999

§ 102(e) Date: Aug. 20, 1999

(87) PCT Pub. No.: WO99/08022

PCT Pub. Date: Feb. 18, 1999

(30) Foreign Application Priority Data

Aug. 11, 1997 (DE) .............................................. 197 34 679

(51) Int. Cl.$^7$ ................................................... F16H 45/02
(52) U.S. Cl. ............................................ 192/3.29; 192/70.2
(58) Field of Search ............................... 192/3.28, 3.29, 192/3.3, 70.2

(56) References Cited

U.S. PATENT DOCUMENTS

| | | | |
|---|---|---|---|
| 4,177,885 | * 12/1979 | Ross ............................... | 192/3.3 |
| 4,785,924 | * 11/1988 | Jackel .............................. | 192/3.29 |
| 5,211,270 | * 5/1993 | Tamura et al. ................... | 192/3.29 |
| 5,337,867 | * 8/1994 | Kirkwood ........................ | 192/3.29 |
| 5,718,311 | * 2/1998 | Victoria et al. .................. | 192/3.28 |
| 5,918,713 | * 7/1999 | Shimizu et al. .................. | 192/3.29 |

* cited by examiner

*Primary Examiner*—Richard M. Lorence
(74) *Attorney, Agent, or Firm*—Darby & Darby

(57) ABSTRACT

A hydrodynamic torque converter wherein the housing is connected to the output element of an engine in the power train of a motor vehicle and receives a coaxial hub which is rotatable by the turbine wheel in the housing or by a clutch disk forming part of a lockup clutch and being axially movably but non-rotatably mounted on the hub. The lockup clutch further comprises a piston which is rotatably and axially movably mounted on the hub, and a laimina which is non-rotatably but axially movably mounted in the housing and extends radially inwardly between the piston and the clutch disk. The clutch is engaged when the piston is moved axially of the housing to urge the lamina against the clutch disk and to thus bias the clutch disk against an adjacent wall of the housing so that the clutch disc then transmits torque between the housing and the hub to thus bypass the torque transmitting connection between the housing and the hub by way of a satator wheel in the housing and the turbine wheel.

11 Claims, 2 Drawing Sheets

HYDRODYNAMIC TORQUE CONVERTER

BACKGROUND OF THE INVENTION

The invention relates to a hydrodynamic torque converter with a turbine wheel and a converter lockup clutch accommodated in a housing, the converter lockup clutch having a piston which can be axially displaced on a hub, a clutch disk secured to the hub in such a way that it cannot rotate relative to the hub, and friction linings on the radially outer portion of the clutch disk. The radially outer part of the input section of the clutch disk is provided with friction linings, and the radially inner part of the output section of the clutch disk is connected to the hub by an internal gear.

Within the housing, hydrodynamic torque converters of such type normally have a pump wheel connected to the housing in such a way that it cannot rotate relative to the housing, and a stator between the turbine wheel and the pump wheel. The piston is normally connected to the hub so that it cannot rotate or can be rotated relative to the hub within a predetermined damper angle range. Torque converters of such type are known, for example, from DE 37 22 860 or DE 44 31 640. Rattling noises, which are generated by the engine-transmission unit when the vehicle is in use, develop due to the large rotary masses of the piston, especially when the combustion engine is idling.

OBJECTS OF THE INVENTION

An object of this invention is to provide a hydrodynamic torque converter with lockup clutch which exhibits acoustic characteristics superior to those of conventional torque converters, especially when the engine is idling, and which can be produced at a lower cost. Another object of the invention is to provide a torque converter which requires a small amount of space for installation, especially in the axial direction.

A further object of the invention is to simplify the making of torque converters and to reduce the number of component parts present in the hydrodynamic torque converter, thus achieving a more economical manufacture of such aggregates.

SUMMARY OF THE INVENTION

In accordance with the invention, this is accomplished in a hydrodynamic torque converter by attaching to the housing an axially movable lamina so that it cannot turn relative to the housing and is installed in an axial position between the radially outer marginal zone of the piston, which latter is mounted in such a way that it can turn freely on the hub, and the friction linings of the clutch disk.

It is particularly advantageous if the piston can turn freely on the hub and is separated from the torque transmitting path. The piston performs the sole function of building up pressure and biasing the lamina and the friction linings which are disposed between the lamina and the complementary friction surface.

It is advantageous if the lamina assumes the shape of an essentially annular element. It is desirable for the lamina to be manufactured as a shaped sheet metal component or a stamping.

It is further desirable to non-rotatably connect the lamina to the housing.

In accordance with one embodiment of the invention, it is advantageous if the lamina has a gear which is on its radially outer marginal portion and mates with an internal gear machined into the housing of the torque converter.

It is also desirable to provide the lamina with a toothed radially outer portion, a radially inner portion extending in a radial direction, and an angular portion disposed between the inner and outer portions and extending both in a radial and in an axial direction.

It is equally desirable if the radially inner marginal portion of the lamina is radially within a radially inner marginal portion of a friction lining.

It is particularly advantageous if the radially inner marginal portion of the lamina is located radially outwardly of a damper of the clutch disk.

BRIEF DESCRIPTION OF THE DRAWINGS

The invention will be described in greater detail with reference to an embodiment which is illustrated in the accompanying drawings. There are shown in:

FIG. 1 a sectional view of a torque converter, and in

DESCRIPTION OF PREFERRED EMBODIMENTS

Figure 1:
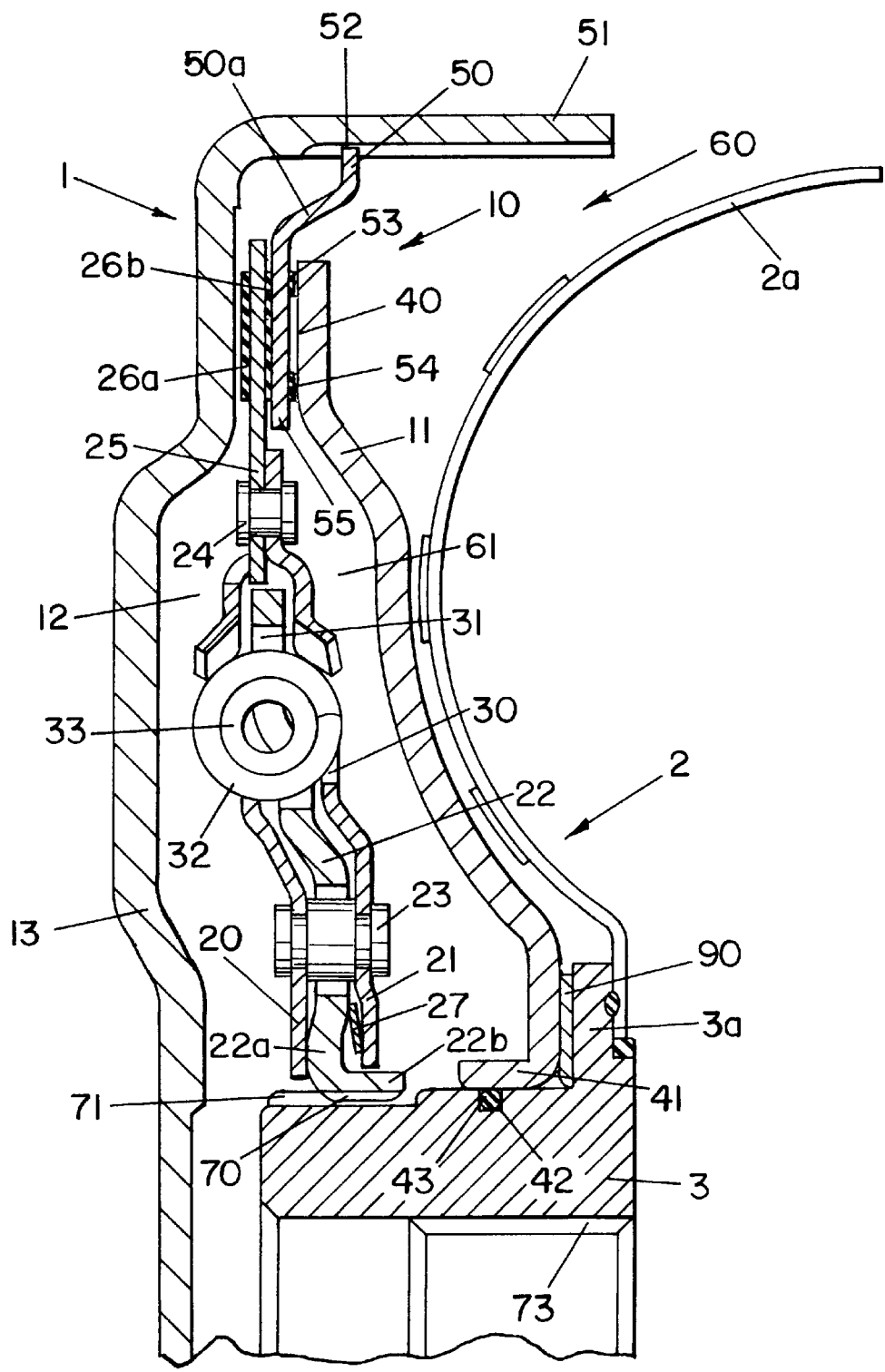

FIG. 1 shows a hydrodynamic torque converter 1 in which the turbine wheel 2 is indicated by a turbine wheel shell 2*a*. The turbine wheel/shell 2, 2*a* is non-rotatably mounted on or connected to a hub 3. The connection normally employs rivets or welds. In addition to the turbine wheel 2, the housing 13 of the torque converter 1 also receives a pump wheel and, if required, a stator.

The turbine wheel 2 of the torque converter 1 and the converter lockup clutch 10 with piston 11 and clutch disk 12 are installed within the housing 13. The clutch disk 12 comprises a torsional vibration damper located between its input and output sections.

The clutch disk 12 consists essentially of a flange (output section) 22 mounted axially between two washers 20, 21 (input section). The washers are fixedly connected to each other at a fixed axial distance by at least one fastener 23 and/or 24, such as a rivet, so that they cannot turn relative to each other. A friction lining carrying plate 25 is connected to the washers 20, 21 by a fastening element 24 and carries friction linings 26*a*, 26*b* on at least one side or, in accordance with a further advantageous embodiment, on both sides. The disk-shaped carrying plate 25 which constitutes a lining backing plate has radially inner tabs 25*a* which are riveted to the washer 21. The washer 20 also has radially inner tabs 20*a* which extend into cutouts in the tabs 25*a* of the lining carrying plate 25. The connection between the washers 20, 21 is then established by means of every second rivet 24, and the other riveted joints 24 serve to connect the carrying plate with one of the wahers. In this way, each rivet is called upon to connect only two sheet metal parts. This brings about the advantage of reduced axial space requirements.

The flange 22 has a radially outwardly extending portion which is provided with windows 31 formed, for example, by punching and serving to receive energy storing devices 32, 33. Furthermore, the flange includes a substantially washer-like leg 22*a* having a radially inner portion 22*b* with an internal gear 70. The internal gear 70 meshes with an external gear 71 of the hub 3. Torque is thus adapted to be transmitted from the flange 22 to the hub 3. The hub 3, in turn, also has an internal gear 73 which can be caused to mesh with a gear on a transmission input shaft (not shown) in order to transmit torque.

The normally circular or oval friction linings 26*a*, 26*b* are attached to the carrier plate 25 essentially by means of an adhesive or by pressing on. The friction linings may be provided with grooves to allow a fluid to flow there-through, also when the converter lockup clutch 10 is engaged.

The washers 20, 21 have apertures 30, such as spring-receiving windows or recesses, as holders for the energy storing devices 32, 33. The flange 22 has the aforementioned windows or cutouts 31, such as spring-receiving apertures, to take the energy storing devices 32, 33. The energy storing devices 32, 33, such as compression springs, are installed in the windows 30, 31 of the washers 20, 21 and the flange 22 in such a way that, when the washers and the flange turn relative to each other, the energy storing devices transmit torque from the washers to the flange. This results in the making of a damper. An energy storing device 27, such as a diaphragm spring, is disposed in the radially inner portion of the damper between the washer 21 and the flange 22 to center the washers 20, 21 and the flange 22 axially. The diaphragm spring 27 is supported radially inwardly by the washer 21 and radially outwardly by the flange 22, whereby the diaphragm spring 27 can be provided with a gear mating with a complementary gear on the flange 22 or washer 21 and can thus be non-rotatably fixed to the flange 22 or washer 21. The diaphragm spring 27 can be installed either between the flange 22 and the washer 20 at the engine side, or between the flange and the washer on the turbine wheel side. It is particularly advantageous if the other washer is in frictional engagement with the flange during relative rotation, as is shown radially inwardly of the fastener 23.

The radially outer marginal portion of the piston 11 has a contact surface or friction surface 40. The piston 11 is shown in the form of an annular element having a central opening which receives the hub 3. Thus, the piston 11 is actually supported by the hub 3. The radially inner portion 41 of the piston is bent in the axial direction and serves as a supporting foot for the hub. A sealing ring 43 is inserted in a circumferential groove 42 between the foot 41 and the hub 3 to seal the piston with reference to the hub. The piston 11 can turn freely and can be displaced axially relative to the hub, and its radially inner portion can be supported by the radially outer portion or collar 3a of the hub 3, and this portion of the hub is provided with an axial bearing 90, such as a bearing washer or a friction or roller bearing which is installed between the piston 11 and the hub portion 3a. In accordance with an advantageous embodiment, the piston 11 is arranged so that it can rotate relative to the hub 3. Therefore, if the input side of the torque converter is caused to vibrate, the torque converter does not cause torsional vibration of the piston and the moment of inertia of the piston is not affected by such vibrations. This enables the piston 11 to reduce, or even completely eliminate, rattling noises.

An annular lamina 50 is installed axially between the one friction lining 26b of the clutch disk 12 and the piston 11, and such lamina is held against rotation relative to the housing 13 by means of a radially outer gear 52 forming part of the lamina and meshing with the internal gear 51 of the housing. The lamina 50 can be displaced axially within the gear 51 of the housing. The form-locking connection between the lamina and the housing is preferably established without the interposition of a further component.

The radially inner marginal portion 55 of the lamina 50 is located radially inwardly of the inner marginal portions of the friction linings. The lamina 50 has a substantially axially extending intermediate portion 50a located between its radially inner marginal portion 55 which extends in a radial direction and its radially outer marginal portion which also extends in a radial direction.

When the pressure in a plenum chamber 60 is caused to rise above that in a plenum chamber 61, the lockup clutch 10 is engaged and the piston 11 is in contact with the friction linings 53, 54 of the lamina 50 and pushes the plate 25 against the friction lining 26b and the friction lining 26a against the friction surface of a radially extending wall of the friction clutch on the housing side. The lockup clutch is disengaged if the pressure in the plenum chamber 61 is higher than in the plenum chamber 60. The friction linings 53, 54 may be replaced with a single friction lining. They serve to transmit axial forces from the piston 11 to the plate 25; at the same time, if there is a difference between the RPM of the lamina 50 and the piston 11, they serve to reduce friction losses or to reduce wear. It is also advantageous for the friction linings to be relatively thin so that heat is dissipated easily via the friction ring(s).

Figure 2:
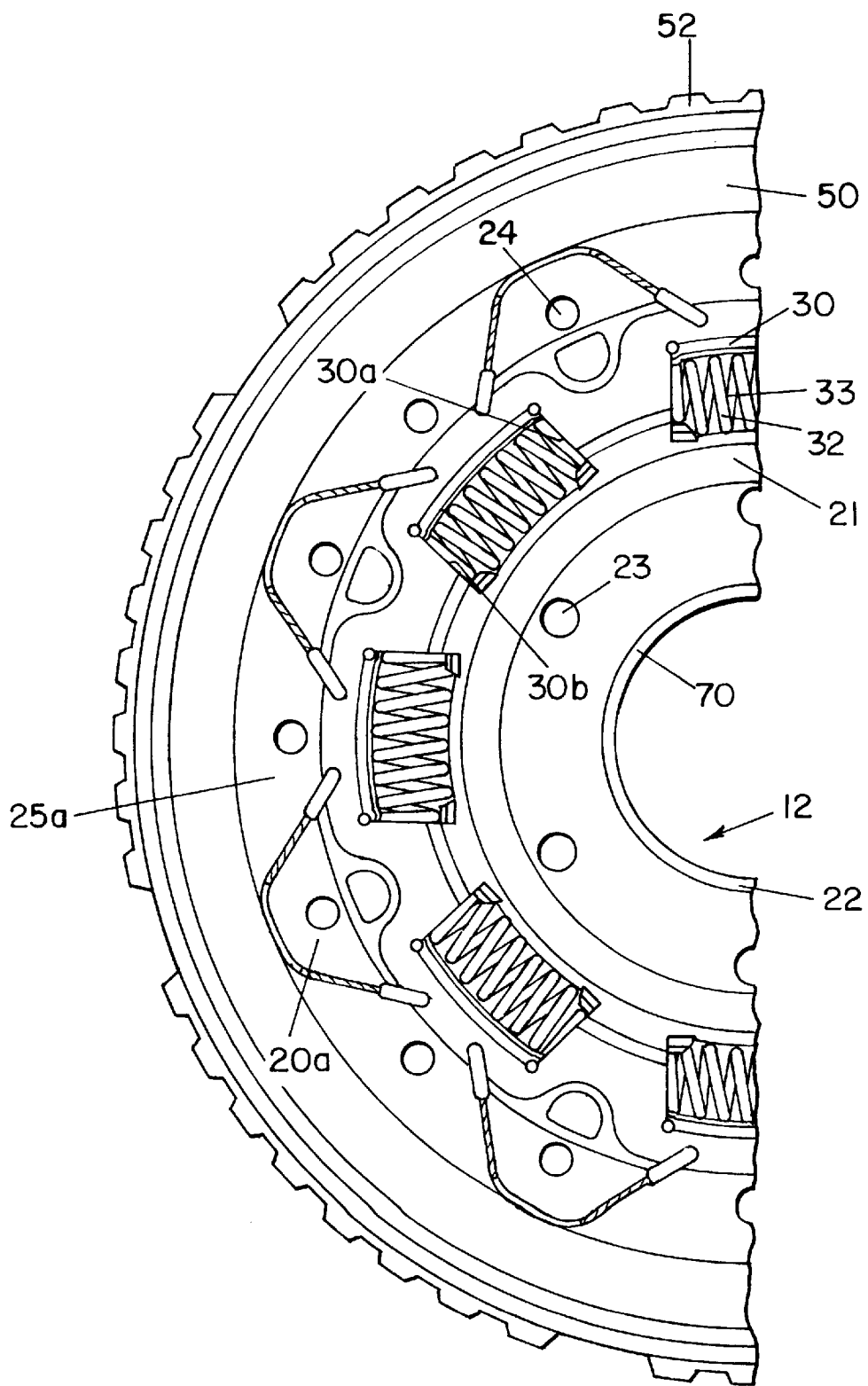
FIG. 2 a plan view of a clutch disc and a lamina.

FIG. 2 shows portions of the clutch disk 12 and of the lamina 50. The internal gear 70 of the flange 22 for transferring torque to the hub 3 is also shown. The washer 21 is connected to the opposing washer 20, not shown, so that it cannot turn relative to the washer 20 and is axially fixed thereto by means of the connecting elements 23, such as rivets. The rivets 23 are evenly distributed around the circumference of the gear 70. The windows 30 for the springs are provided in the washers 20 and 21, for example, by punching, to hold the energy storing devices 32, 33. These energy storing devices take the form of coaxially arranged coil springs having different diameters and having end convolutions at the ends 30a, 30b of the windows 30, as seen in the circumferential direction of the flange 22, to transmit torque between the flange 22 and the washers 20, 21.

The annular backing plate 25 for the friction linings 26a, 26b is connected, by means of the rivets 24, with at least one of the washers 20, 21 in the radially outer region of the clutch disk 12. This backing plate has at least one friction lining or linings at both sides, and the friction linings preferably have grooves to allow fluids to pass therethrough for the purposes of cooling.

The present application also incorporates, by reference, the older application DE 196 34 029 the contents of which are to be considered as forming part of the disclosure in the specification of the present application.

The lamina 50 has a friction surface which can come into frictional contact with the adjacent surface of the friction lining 26b when subjected to pressure by the piston 11. The gear 52 in the radially outer portion of the lamina 50 meshes with the internal gear 51 of the housing 13. The mating gears 51, 52 cause the lamina 50 to rotate with the housing 13 but these gears allow the lamina 50 to move axially of the housing.

When the lockup clutch 10 is engaged, transmission of torque or forces takes place from the housing 13 of the torque converter 1 to the adjacent friction surface of the friction lining 26a of the clutch disk 12 as well as from the housing 13, by way of the gears 51, 52, to the lamina 50, from the lamina 50 to the adjacent friction surface of the friction lining 26b on the clutch disk 12 and from there by way of the washers 20, 21 and the energy storing devices 32, 33 to the flange 22 and from the flange 22 by way of the gears 70, 71 to the hub 3 and from the hub 3 to the input shaft of the transmission, not shown. The piston 11 is not used for the transfer of torque because it can turn with respect to the hub 3 and with respect to the housing 13.

The sequence of the components of the lockup clutch 10 is as follows (when viewed in the axial direction): housing 13 with its friction surface, friction lining 26a with its friction surface, backing plate 25 for the friction lining 26b, friction lining 26b with its friction surface, the lamina 50 and the piston 11.

The torque converter which is shown in FIGS. 1 and 2 consists essentially of sheet metal components which can be formed by shaping, such as for example deep drawing. At least some of the components, such as the piston 11 for example, may be made of aluminum.

If a suitable control system is provided with computerized controls, for example, and valves which can be actuated to apply pressure in the plenum chambers 60, 61, the torque converter 1 and its lockup clutch 10 can be operated in such a way that the lockup clutch can be operated to slip within an operating range and can be fully engaged or disengaged, depending upon the selected operating point.

What is claimed is:

1. A hydrokinetic torque converter, comprising:

a housing rotatable about a predetermined axis;

a hub coaxial with, disposed within and rotatable relative to said housing;

an engageable and disengageable lockup clutch disposed in said housing and including a piston rotatably mounted on said hub and movable axially of said housing to thus engage and disengage the clutch, a lamina arranged to rotate with and axially movably installed in said housing, and means for transmitting torque between said lamina and said hub in the engaged condition of the clutch, said lamina having an annular shape; and wherein at least one of said housing and said lamina includes means for preventing said lamina and said housing from rotating relative to each other, said means for preventing comprising an internal gear in said housing and a complementary gear provided on said lamina and meshing with said internal gear, wherein said internal gear is of one piece with said housing, said lamina including a radially outer portion extending substantially radially of said axis and provided with said complementary gear, a radially inner portion adjacent said piston and extending substantially radially of said axis, and an intermediate portion disposed between said radially outer and radially inner portions and extending radially of said axis as well as in the direction of said axis; said lockup clutch including a clutch disk arranged to rotate with said hub, said piston being freely axially movable relative to said housing, said lockup clutch further including first and second friction linings adjacent said lamina and adjacent a radially outer portion of said piston.

2. The torque converter of claim 1, further comprising a turbine wheel disposed in and rotatable with as well as relative to said housing and affixed to said hub, said lockup clutch being disposed between a substantially radially extending wall of said housing and said turbine wheel.

3. The torque converter of claim 1, wherein said piston has a radially outer portion remote from said axis and said lamina overlaps said radially outer portion of said piston as seen in the direction of said axis.

4. The torque converter of claim 3, wherein said lockup clutch further comprises a clutch disk arranged to rotate with said hub and having at least one friction lining adjacent said lamina, said at least one friction lining being engaged by at least one of said piston and said lamina in the engaged condition of the clutch.

5. The torque converter of claim 1, wherein said clutch disk includes a damper having an input portion arranged to recieve torque from said lamina in the engaged condition of the clutch, an output portion non-rotatable connected to said hub, and at least one energy storing element arranged to transmit torque between said input and output portions, said lamina having a radially inner portion disposed radially outwardly of said at least one energy storing element.

6. The torque converter of claim 5, wherein said at least one energy storing element comprises a coil spring acting in a circumferential direction of said piston.

7. The torque converter of claim 1, wherein at least a portion of at least one of said housing and said lockup clutch consists of a metallic sheet material.

8. The torque converter of claim 1, wherein said clutch disk has a radially outer portion adjacent said lamina and a radially inner portion provided with an internal gear mating with an external gear of said hub and movable relative to said external gear in the direction of said axis.

9. The torque converter of claim 1, wherein said housing includes an annular wall adjacent said lamina and said clutch disk is disposed between said wall and said lamina and having a radially inner portion axially movable but non-rotatably mounted on said hub, said piston being arranged to bias said lamina axially of said housing against said clutch disk and to thus cause said lamina to urge said clutch disk against said wall in the engaged condition of the clutch.

10. The torque converter of claim 9, wherein said lockup clutch further comprises at least one friction lining interposed between at least two of said piston, said lamina and said clutch disk.

11. The torque converter of claim 1, wherein said housing defines two plenum chambers and said piston is disposed between said plenum chambers.

* * * * *

UNITED STATES PATENT AND TRADEMARK OFFICE
CERTIFICATE OF CORRECTION

PATENT NO.   : 6,193,037 B1
DATED        : February 27, 2001
INVENTOR(S)  : Volker Middlemann et al.

It is certified that error appears in the above-identified patent and that said Letters Patent is hereby corrected as shown below:

Title page,
Item [73] Assignee, change "Gitreibe-Systeme" to -- Getriebe-Systeme --.

Signed and Sealed this

Twelfth Day of February, 2002

Attest:

JAMES E. ROGAN
Attesting Officer    Director of the United States Patent and Trademark Office